UNITIZED MAGNETIC ASSEMBLY

Filed March 11, 1966 2 Sheets-Sheet 1

INVENTORS
BERNARD SCHWARTZ
HAROLD L. TURK

BY Littlepage & Quaintance
ATTORNEYS

UNITIZED MAGNETIC ASSEMBLY

Filed March 11, 1966 2 Sheets-Sheet 2

INVENTORS
BERNARD SCHWARTZ
HAROLD L. TURK

BY Littlepage & Quaintance
ATTORNEYS

United States Patent Office 3,478,340
Patented Nov. 11, 1969

3,478,340
UNITIZED MAGNETIC ASSEMBLY

Bernard Schwartz, Poughkeepsie, and Harold L. Turk, Wappingers Falls, N.Y., assignors to International Business Machines Corporation, Armonk, N.Y., a corporation of New York Filed Mar. 11, 1966, Ser. No. 533,565
Int. Cl. G11b 5/00, 5/42
U.S. Cl. 340—174.1 10 Claims

ABSTRACT OF THE DISCLOSURE

A magnetic transducer of unitized structure having a plurality of layers of magnetic material which are spaced and isolated from each other by integral intermediate layers of non-magnetic material integrally bonded to the magnetic material.

This invention relates to magnetic elements and the method of forming them.

When two or more magnetic members are integrally connected, the magnetic effects in each may influence the action of the others unless the magnetization in each member is isolated from the others. When the magnetic members are constituents of an integrated structure, it is desirable to isolate them from each other by an intermediate substance.

It is an object of this invention to form a unitized structure having a plurality of layers of magnetic material which are spaced and isolated from each other by integral intermediate layers of non-magnetic material integrally bonded to said magnetic material.

It is another object of this invention to form a structure of a plurality of magnetic elements in the shape of elements of recording heads integrally bonded by intermediate layers of non-magnetic material which spaces and isolates said elements from each other.

It is a further object of this invention to form an intermediate structure of a plurality of alternate layers of magnetic particulate material and non-magnetic particulate material having the shape of magnetic elements in final form, said particulate material in each of said layers being bonded into a solid material component by a suitable binder, the binders in said layers adhering to each other to form said structure, and the non-magnetic material extending between said layers of magnetic material to isolate them completely from each other.

In accordance with this invention sheets of "green" magnetic ferrite material are formed from a slurry containing a ferrite, a binder and a volatile solvent, and other sheets are formed of a non-magnetic ceramic isolating material and a binder with a solvent. These sheets when dried and firm, are pressed into a composite, laminated structure having the layers of non-magnetic material between the layers of magnetic material so as to isolate the sheets of magnetic material from each other.

This composite, laminated structure is easily worked, and can be cut into shapes to form plural magnetic elements spaced and connected by non-magnetic material. After the articles are in shape for use as magnetic elements, the composite elements are fired, so that the several layers of each element are sintered, and the particles in the layers coalesce to form a unitized structure of a plurality of magnetic elements integrally connected and spaced by non-magnetic, isolating layers.

The realization of the above and other objects along with the features and advantages of the invention will be apparent from the following description and the accompanying drawings in which.

Figure 1:
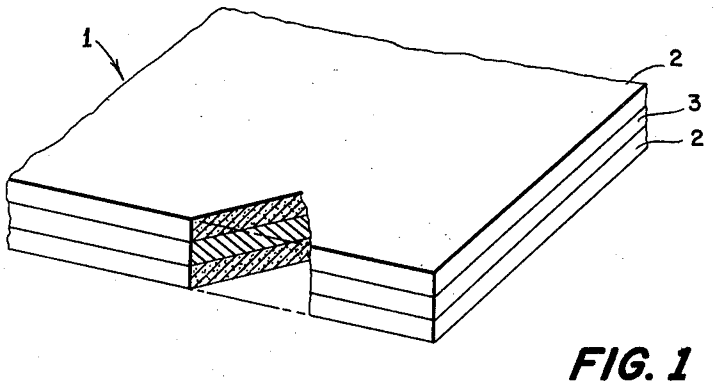
FIGURE 1 is an isometric view of a composite structure formed of layers of magnetic material and binder.

The composite structure 1 in FIGURE 1 is made up of layers 2 of magnetic ferrite material and binder spaced by a layer of non-magnetic material with an organic binder. The layers 2 are made by mixing ferrite powder with a binder and solvent to produce a slurry, then spreading this substance on a base and smoothing to uniform thickness with a "doctor" blade. Suitable magnetic ceramic materials are described by Bernard Schwartz in Semiconductor Products and Solid State Technology, vol. 6, No. 6, June 1964, 26–30; vol 7, No. 7, July 1964, 26–29. The intermediate layer is formed in similar manner with a compatible non-magnetic material such as palladium or non-magnetic ferrite, and binder and solvent. After evaporation of the solvent, the layers are peeled off the base and combined under moderate heat and pressure, so they cohere in a composite structure. This process is similar to that described in the patent to Park, 2,966,719, and patents to Howatt, 2,486,410, and to Howatt et al., 3,040,301, and is described in RCA Review, December 1963, pages 705–729, under the title "Laminated Ferrite Memory."

Figures 2, 3, 4:
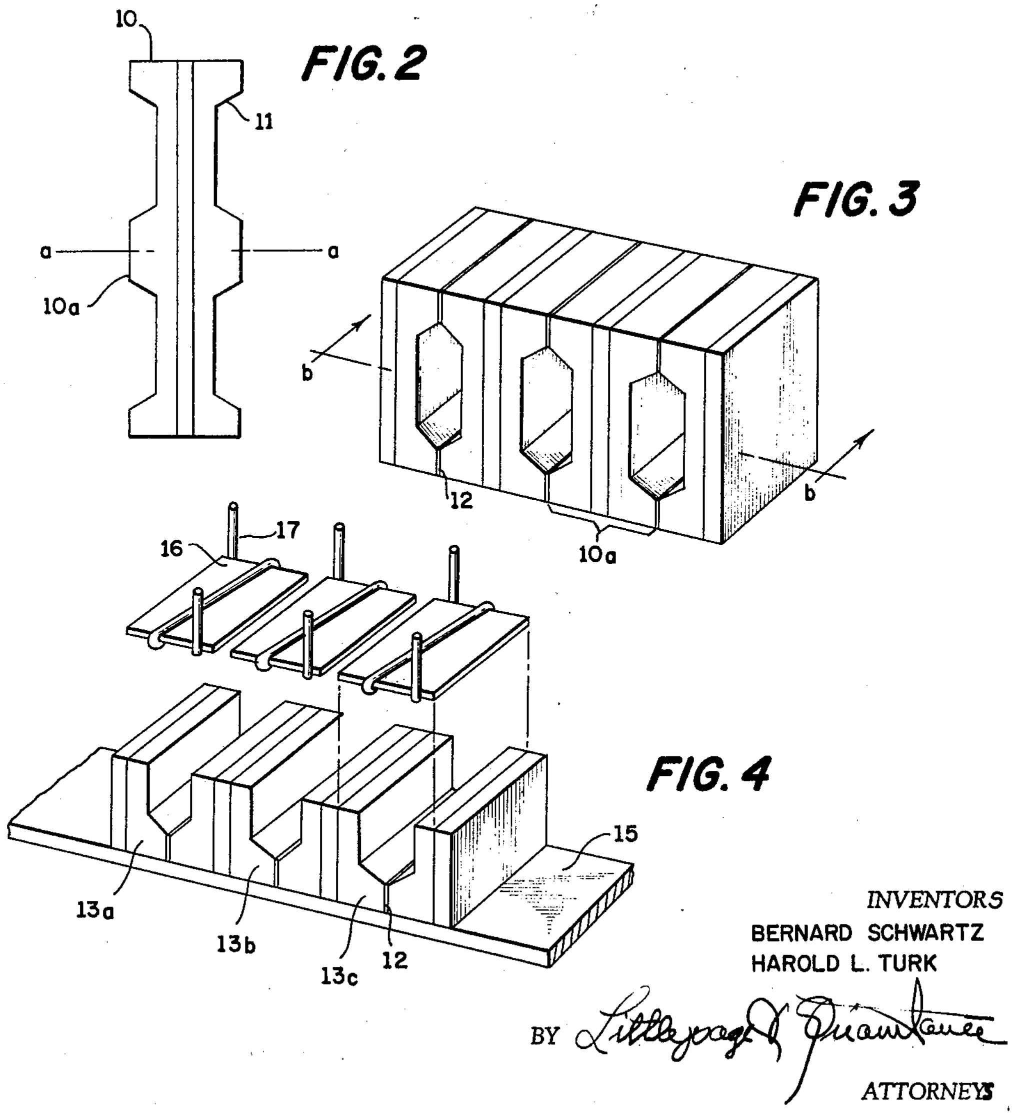
FIGURE 2 shows a shape cut out of the sheet to form integrally connected magnetic elements.
FIGURE 3 shows the elements of FIGURE 2 joined to form an assembly of a plurality of recorder heads.
FIGURE 4 shows the completed heads formed from the assembly of FIGURE 3, with the recorder tape.

The structure thus formed is firm and easily worked. The shape 10 which may be formed from the laminated structure 1 is shown in FIGURE 2, in which a strip or single shape may be cut from the structure of FIGURE 1 and channels formed in the layers 2 of the strip as at 11. This strip or shape 10 may then be cut in half along line *a—a* to form members 10*a* and the members sintered to form a unitized structure. A plurality of elements of recorder heads are formed by assembling the sintered members 10 as shown in FIGURE 3 and filling the gaps 12 by capillarily infusing glass therein, as described in the application of Cook and Ruszczyk, Ser. No. 431,672, filed Feb. 10, 1965. The structure is cut in half along line *b—b* in FIGURE 3, and a bar 16 with winding 17 is secured across the legs of each element, as indicated in FIGURE 4, completing the magnetic circuit and forming a complete recording head.

These heads with the windings 17 for read and write currents, cooperate with a single track on the tape. The head 13*a* "writes" on the tape to record, 13*b* is used to read from the tape and 13*c* reads back following recording as a check on the writing.

Figure 5:
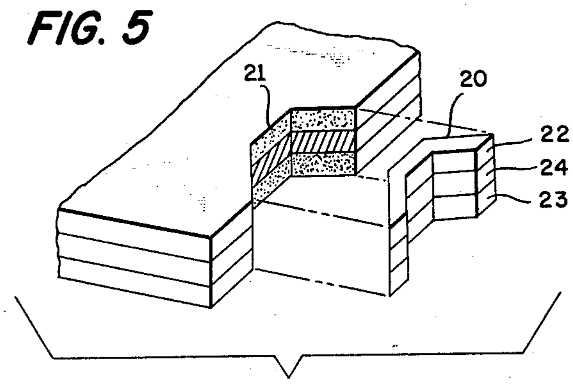
FIGURE 5 shows a different shape cut out of the structure of FIGURE 1.
Figure 6:
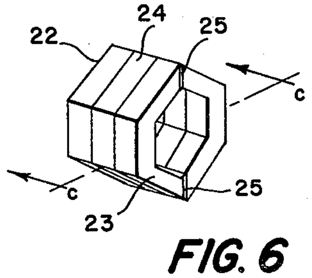
FIGURE 6 shows an assembly made up of the portions cut out as shown in FIGURE 5.

Another form of magnetic element is shown in FIGURE 5, in which a shape 20 is cut from the structure 1 as at 21, and this structure is then fired to sinter the materials in the layers. The sintering removes the binder and causes the powdered material of the layers 2 and 3 to coalesce, joining magnetic elements 22, 23 integrally by the non-magnetic material 24. The palladium or other non-magnetic material coalesces readily with the magnetic ferrite, thus forming the layers into a unitized structure and isolating the layers of magnetic material from each other.

Two of these members 20 may be joined face to face with gaps 25 at each end between the magnetic elements 22 and 23. These gaps may be filled with fused glass in the manner referred to above. This structure is then cut in half as along line *c—c* to form two recording heads side by side for recording on or sensing two tracks on a magnetic tape.

Figure 7:
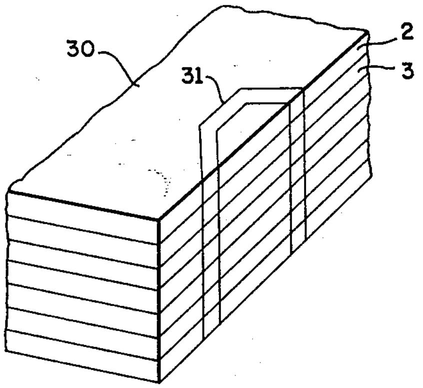
FIGURE 7 shows a structure similar to that of FIGURE 1 made of a large number of layers, and illustrating a shape which may be cut out of the structure.
Figure 8:
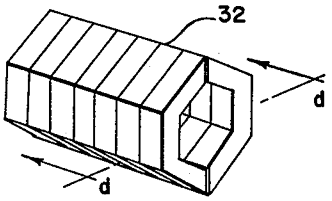
FIGURE 8 shows the elements cut out of the structure in FIGURE 7 joined to form an assembly of recorder heads.
Figure 9:
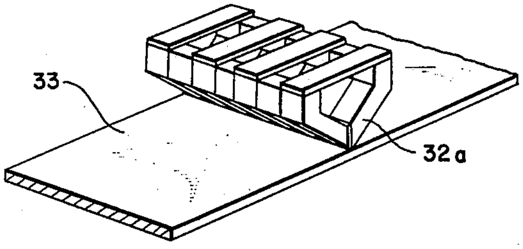
FIGURE 9 shows the complete multiple recorder head formed from the assembly of FIGURE 8 with the recorder tape.

The initial composite structure 30, as in FIGURE 7, may be formed of a large number of layers 2 and 3. Four layers 2 of magnetic material are shown spaced by three layers 3 of non-magnetic material. Sections 31 are cut from this structure, and two such sections, after sintering, may be joined with intermediate gaps to form the plural head assembly 32 in FIGURE 8. When cut in half along line *d—d*, the head assembly **32*a* may extend across four channels on the tape 33** as will be seen from FIGURE 9. Each magnetic head will write and read in one channel of the tape.

The layers 2 of magnetic material may be made by mixing ferrite powder with a binder such as "Butvar B–98" or "Butvar B–76," made by Shawinigan Resins Corp., Springfield, Mass., with a volatile solvent of 60/40 toluene-ethanol. Other commercially available polyvinyl butyral resin could be used in a like manner. A plasticizer for the polyvinyl butyral such as "Flexol" of Union Carbide Chemical Co. is also mixed with the binder. After this slurry is spread evenly on a base, it will dry rapidly to form a firm sheet. The layer 3 of non-magnetic material is made in a similar manner, using palladium instead of ferrite powder. This general process is a development of that shown in the application of Schwartz, Ser. No. 377,810, filed June 25, 1964.

These green sheets then are arranged in alternate laminae of ferrite and palladium and, under moderate heat and pressure, the strips cohere to form the structure shown at 1 or 30. After the shapes have been formed by cutting or punching, they are sintered at temperatures on the order 1,000° C. to 1,500° C.

Using this technique, it is possible to form different magnetic members having a plurality of magnetic elements. Cylindrical elements with holes punched from the sheets may form magnetic toroids spaced by the non-magnetic material, or elements of the material may be used for writing and reading without disturbance of each magnetic element by another.

While the invention has been particularly shown and described with reference to certain preferred embodiments thereof, it will be understood by those skilled in the art that various changes in form and details may be made therein without departing from the spirit and scope of the invention. The magnetic materials and the non-magnetic materials separating and isolating the magnetic materials which have been described are illustrative of materials suitable for these and similar purposes. The invention also includes within its broad scope other materials which have appropriate properties and which coalesce within a common range of temperature to form a unitized structure.

What is claimed is:

1. A structure forming part of a magnetic assembly comprising alternate layers of magnetic ceramic material and non-magnetic ceramic material sintered as a laminated entity from the green ceramic state to fuse the particles of said materials into a hardened mass to form a unitized structure retaining the desired alternate distribution of magnetic and non-magnetic properties, said layers of non-magnetic material completely separating said layers of magnetic material and isolating said layers of magnetic material from each other.

2. An assembly comprising a plurality of magnetic recorder heads, each head being formed of two elements of magnetic ceramic material having a gap therebetween, adjacent heads being integrally connected by a layer of non-magnetic ceramic material between said heads, said magnetic and non-magnetic ceramic materials being sintered to fuse the particles of said materials into a hardened mass to form a unitized structure so as to isolate adjoining portions of said heads by said non-magnetic ceramic material.

3. As an article of manufacture, a plurality of elements of magnetic ceramic material, each forming one half of a recorder head, and a layer of non-magnetic ceramic material between confronting faces of each two elements, said magnetic and non-magnetic ceramic materials being sintered to fuse the particles of said materials into a hardened mass to form a unitized structure so as to isolate said elements of magnetic material.

4. A composite structure comprising two layers each formed of particulate magnetic material bonded together by a binder and each formed in the shape of one half of a plurality of recorder heads, and a co-extensive layer between and joining said two layers formed of non-magnetic particulate material bonded into a layer by a binder, said layers adhering to each other by the adherence of said binders.

5. The method of manufacturing an assembly of a plurality of magnetic recording heads for juxtaposition to a recording tape comprising the steps of forming a plurality of layers of magnetic particulate material bonded by a binder and spaced and connected by intermediate layers of non-magnetic particulate material bonded by a binder, cutting shapes from said layers having coextensive elements of said layers of magnetic material and layers of non-magnetic material in the form of portions of magnetic recorder heads, firing said composite shapes to sinter said layers and to coalesce said intermediate non-magnetic layers and said magnetic layers to join said magnetic layers and to isolate said magnetic layers from each other, assembling a plurality of said shapes with the magnetic portions of each shape confronting the magnetic portions of a complementary shape to form recording gaps between, and inserting non-magnetic material in said gaps between said portions of magnetic material.

6. The method of manufacturing an assembly of a plurality of magnetic recording heads comprising forming a plurality of layers of magnetic particulate material bonded by a binder and spaced and connected by intermediate layers of non-magnetic particulate material bonded by a binder, adhering said layers into a composite structure under moderate heat and pressure without destruction of said binders, cutting shapes from said composite structure by cutting through said layers perpendicular to the surface of said layer structure and forming a plurality of portions of the shape of portions of magnetic recording heads joined by intermediate layers of said non-magnetic material, firing said composite assembly to sinter said layers and remove said binders and coalescing said intermediate layers and said layers of magnetic material, joining two of said assemblies with said portions of said heads confronting each other to form gaps between said heads, and inserting non-magnetic material in said gaps so that said complementary portions form complete magnetic recording heads.

7. A multiple recorder head assembly comprising a plurality of recorder heads having gaps arranged to register with a recorder tape, each of said recorder heads being formed as two elements having a gap filled with non-magnetic material between them, each of said elements being composed of a unitized particulate magnetic ceramic material, adjacent elements of adjoining heads being integrally connected by a layer of particulate non-magnetic ceramic material, said magnetic and non-magnetic ceramic materials being sintered to fuse the particles of said materials into a hardened mass so as to space and isolate said elements, said recording heads and connecting layers of non-magnetic material forming a unitized assembly of a plurality of recording heads.

8. A multiple recorder head assembly as claimed in claim 7, in which said recorder heads are arranged serially to register with a single track of a recorder tape, and the adjoining elements of said heads connected by said non-magnetic material are portions of heads arranged successively along said track.

9. A multiple recorder head assembly as claimed in claim 7, in which said recorder heads are arranged side by side to register with parallel plural tracks on said recorder tape, and the adjoining elements of said heads connected by said non-magnetic material are portions of heads arranged across said tape so that two adjacent heads transversely of said tape are connected by layers of non-magnetic material to form a unitized assembly.

10. A magnetic device comprising a body of sintered ceramic material composed of particles fused into a hardened mass to form a unitized member, in which regions composed of particles of fused magnetic ceramic material are bordered by regions of fused non-magnetic ceramic material with said regions of magnetic material completely isolated from each other by said non-magnetic material.

References Cited

UNITED STATES PATENTS

| | | | |
|---|---|---|---|
| 3,357,005 | 12/1967 | Geurst et al. | 179—100.2 |
| 3,353,261 | 11/1967 | Bradford et al. | 179—100.2 |
| 3,126,615 | 3/1964 | Duinker | 179—100.2 |

TERRELL W. FEARS, Primary Examiner

V. P. CANNEY, Assistant Example

U.S. Cl. X.R.

29—603; 179—100.2; 346—74